Aug. 3, 1954     G. L. HAMMON     2,685,300
VALVE CONTROL
Filed Dec. 9, 1948
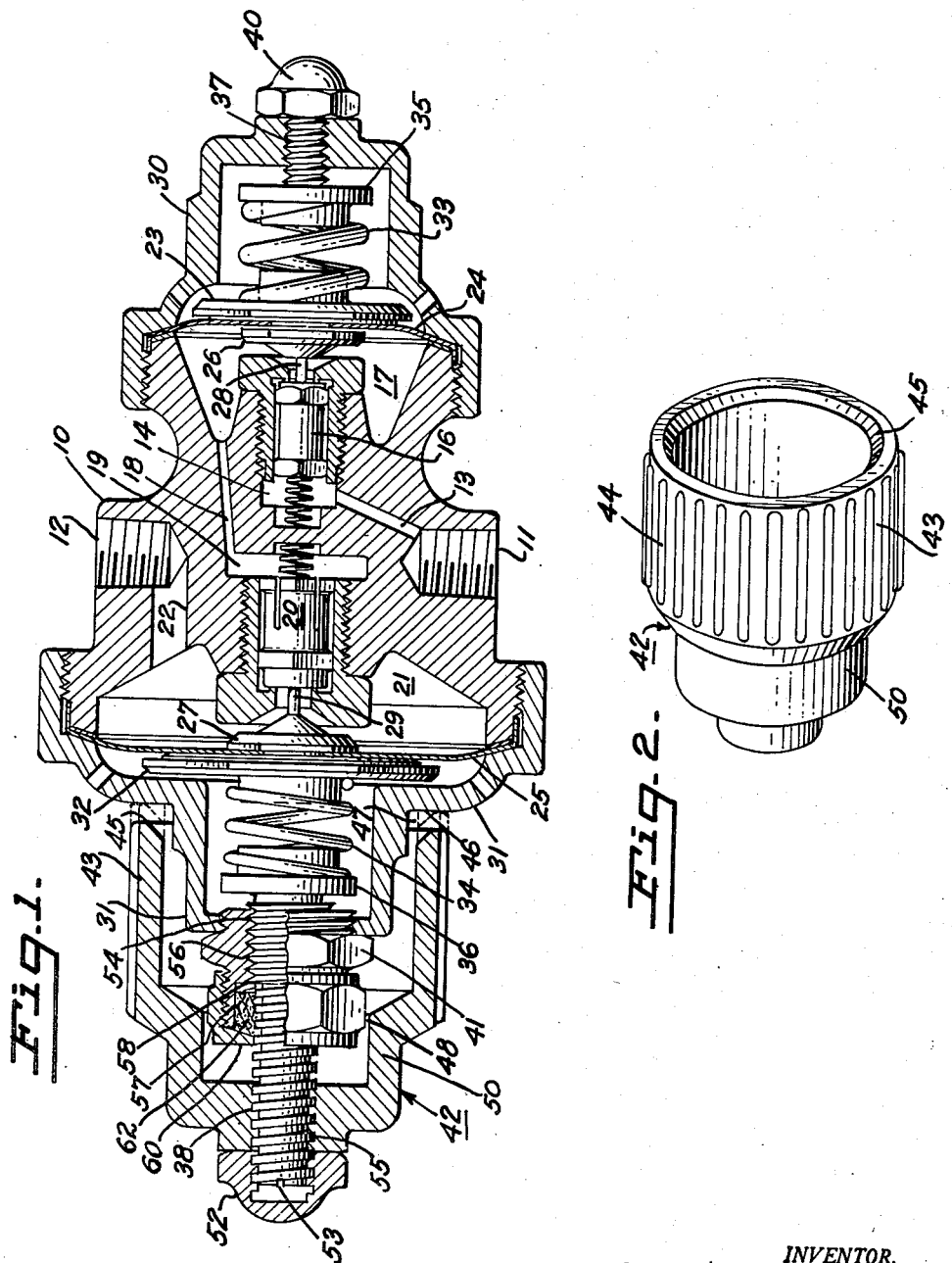
INVENTOR.
GEORGE L. HAMMON
BY
ATTORNEY Patented Aug. 3, 1954

2,685,300

UNITED STATES PATENT OFFICE 2,685,300

VALVE CONTROL

George Leonard Hammon, Oakland, Calif., assignor to National Welding Equipment Co., San Francisco, Calif., a corporation of California Application December 9, 1948, Serial No. 64,379

3 Claims. (Cl. 137—382)

This invention relates to a regulator for reducing the pressure of gas from a very high pressure at its inlet to a low working pressure at the outlet. More particularly, the invention relates to improvements in the regulator adjusting mechanism.

This application is a continuation-in-part of applications, Serial Nos. 733,927, now Patent No. 2,597,479, and 733,928, now abandoned, filed March 11, 1947.

In the usual regulator the adjusting mechanism is a screw which projects outside the housing and is turned by a handle not unlike the usual handle on a carpenter's or mechanic's vise. The threads of the adjusting screw are exposed to whatever particles of dust or other foreign matter are in the air. This dust and grit get on the threads of the adjusting mechanism, and by abrading them, soon wear them out.

This wear means ultimate replacement both of the adjusting screw and of the housing in which it is threaded. It also means that, until replaced, the threads continue to get looser. This looseness permits the adjusting screw to wobble in the housing, and affects the accuracy of the adjustment. For, when the screw is set to deliver a particular desired flow of gas, a slight wobble may cause a considerable change in flow. This invention solves the problem of preventing this wear, by preventing dust from getting into the threads in the first place.

The problem of worn threads leads to another problem. Regulators are often set to deliver a certain rate of flow of gas, while the flow is turned on and off by another valve. As long as the regulator delivers gas, the gas pressure forces the adjusting screw out and against the back of the threads in the housing. When the gas flow is turned off, a worn screw will move to a forward position. When the gas is turned on again, the flow may be at an entirely different rate because the loose threads have let the adjustment change. This wear, known as "back lash," has been a general source of complaint with regulators, and is caused by the wear on the adjusting threads. This invention also stabilizes the adjusting threads against wobbling, even when they do become worn from long use.

The fact that the regulator threads have heretofore been exposed, sometimes has tempted operators to oil the threads in the belief that by so doing they could make the adjustment action smoother. Most lubricants are extremely dangerous around high pressure oxygen because they are inflammable or even explosive, and many accidents have occurred because of such attempts to obtain smoother movement of the adjusting screw and to eliminate squeaks. Lubrication, if practiced at all, should be done at the factory. This invention prevents this ignorant tampering and also solves the lubrication problem, first, by providing a permanent lubrication system for the adjusting threads and, second, by providing a regulator construction which discourages tampering.

Other problems solved by this invention are those caused by the accidental withdrawal of the adjusting screw from the regulator housing. Sometimes operators carry the regulator by the adjusting screw. As they have walked along swinging the conventional regulators, the motion has sometimes caused the screw to come all the way out of the housing, and the regulator has then dropped on the floor and has been damaged. The fact that it is so easy to take out the adjusting screw has also encouraged ignorant tampering with the regulator, sometimes leading to fatal results. The present invention solves this problem by providing a construction where the thread cannot be withdrawn accidentally, and is less likely to be taken out at all by a tamperer.

A further problem solved by this invention is that of the waste of gas and injury to welds through the use of too high a pressure. This invention solves this problem by providing a maximum stop arrangement. By means of this device the foreman or superintendent can readily adjust the regulator to deliver a certain maximum pressure, and his adjustment cannot be too easily changed by the workmen.

One object of this invention is to provide a safer regulator by solving the above problems.

Another object of the invention is to protect the adjusting screw from wear, by sealing off its threads from dust.

A further object of the invention is to provide a regulator having a handle which also serves as a dust-protecting cap, shielding the whole adjustment mechanism from foreign matter in the air.

A still further object is to provide a regulator in which the actual adjusting threads are protected by an inside dust seal.

A further object of the invention is to overcome back lash in a regulator adjusting mechanism.

A still further object of the invention is to provide a safe lubrication system for the adjusting mechanism of a regulator.

Another object of the invention is to provide a regulator having a structure which discourages tampering.

Still another object of the invention is to provide a regulator in which the adjusting mechanism cannot be withdrawn from the housing accidentally.

Another object of the invention is to provide a regulator which can be pre-set to deliver no more than a desired maximum pressure.

Another object of the invention is to provide a regulator having a maximum pressure adjustment, which, when once set cannot easily be tampered with.

Other objects and advantages of the invention will appear from the following description.

In the drawings:

Fig. 1 is a view in section of an improved regulator embodying this invention; and Fig. 2 is a view in perspective of the handle.

The pressure regulator used in describing the invention to be claimed in this present case is the two-stage regulator shown in my copending case, Serial No. 733,926, filed March 11, 1947, now abandoned. The invention here described may be applied to other forms of regulators as well as to the one shown. For example, the invention is just as applicable to the single stage regulator shown in my copending application, Serial No. 733,925, filed March 11, 1947, now abandoned.

A central housing 10 is recessed around its periphery to provide an inlet 11 and an outlet 12. The usual safety openings and gauge openings are not shown since they do not affect this invention.

In passing through the regulator the gas goes from the inlet 11 through a conduit 13 into a high pressure chamber 14. The first stage of regulation is obtained by passing the gas from the chamber 14 through a valve 16 into an expansion chamber 17. A conduit 18 then conducts the gas into a medium pressure chamber 19, and the second stage of regulation is obtained by passing the gas through a valve 20 into an expansion chamber 21. The gas is then conducted to the outlet 12 by a conduit 22. The valves 16 and 20 are described in more detail and are claimed in my copending application, Serial No. 733,924, filed March 11, 1947, now Patent No. 2,597,478.

Diaphragms 24 and 25 form one end of their respective expansion chambers 17 and 21, and are mounted on diaphragm mounts 26 and 27, which also carry actuating pins 28 and 29.

The diaphragm 24 is held in position by a rear housing 30, and the diaphragm 25 is held by a front housing 31, both these auxiliary housings 30 and 31 being threaded onto the central housing 10.

Springs 33 and 34 rest on the top of diaphragm plates 23 and 32, which are threaded on the diaphragm mounts 26 and 27. The plates 23 and 32 support bearing members 35 and 36, and the bearing members are in contact with two adjusting screws 37 and 38. Thus, as the screws 37 and 38 are moved forward, the springs 33 and 34 are compressed, and when the gas pressures on the opposite side of the diaphragms 24 and 25 are overbalanced by the spring compression, the actuating pins 28 and 29 open their respective valves 16 and 20. These diaphragms and valves may or may not operate in unison.

The adjusting screw 37 preferably is set at the factory so that the expansion chamber 17 delivers the correct pressure to the medium pressure compartment 19, and a set screw cap 40 is then screwed on to protect the screw 37 from dust and tampering.

The adjusting screw 38 is the mechanism used by the operator to vary the pressure of the gas issuing from the regulator. A combination member 42 is threaded on the adjusting screw 38, and this member 42 acts as a dust-protecting cap, as a handle, and as a stop to prevent an operator from turning the handle beyond a predetermined pressure setting. Its skirt 43 comes down over the top of the front housing 31 and is grooved at 44. When the adjusting screw 38 is in its extreme inward position, a rim 45 on the handle 42 rests against a shoulder 46 of the housing 31 (shown in dotted lines in Fig. 1). In that position the handle 42 prevents all dust from reaching the adjusting screw 38.

At other positions it is still possible for a small amount of dust to enter through the space at 47, but any dust which does so enter is hindered from reaching the screw 38 by the restricted clearance at point 48, where a narrow portion 50 of the cap 42 almost touches the adjusting screw housing 41. When in its positions away from the shoulder 46, the cap 42 protects the exposed portion of the adjusting screw 38 by virtue of the fact that, in order to reach the screw, dust must follow a path beset by obstructions.

A lock nut cap 52 is also threaded on the adjusting screw 38. This lock nut cap 52 may be removed from the screw 38, and a screwdriver may then be inserted in a groove 53 in the upper end of the screw 38. The screw 38 may be set so that the diaphragm will deliver a desired maximum working pressure; then the screw 38 may be held in the same position by the screwdriver while the dust cap 42 is threaded on down the screw until its rim 45 rests on the shoulder 46. Then the set screw cap 52 may be replaced and locked against the cap 42. The regulator is then set to deliver a selected maximum pressure. The operator may still obtain a lower pressure by turning the handle 42 so as to turn the screw 38 and lift the rim 45 away from the shoulder 46; but no higher pressure can be obtained because the handle 46 will not move the screw past the point where it rests on the shoulder 46 of the housing.

As already pointed out, the dust cap 42 cooperates with the housing to form a preliminary dust seal protecting the entire screw 38. In fact, when the dust cap 42 is in the position where the rim 45 rests on or is near the shoulder 46 of the housing, a substantially complete dust sealing of the screw 38 is obtained, and this sealing can be obtained for the normal operating pressure of the regulator, or any other desired pressure.

A secondary dust seal protects the actual adjusting threads. An inner portion 54 of the screw 38 is of larger diameter than its outer portion 55. The outer portion 55 preferably has square threads, while the inner portion 54 preferably has V-shaped threads which engage the interior threads 56 of the adjusting screw housing 41. These threads 54 and 56 actually determine the position of the screw 38 and, therefore, the pressure of the spring 34 on the diaphragm 25.

A washer 57 is preferably held against or adjacent the outer end of the threads 56. The washer 57 has an opening too small to permit passage of the larger-diameter screw portion 54. A packing cap 60, whose opening has only a narrow clearance around the screw portion 55, is threaded around the outer end of the screw housing 41.

Between the cap 60 and washer 57, the space around the screw portion 55 is filled with a resilient packing material 62. The material 62 is preferably a composition of asbestos, lead wire, copper wire, and a vegetable oil. This compressible packing 62 is held in a snug, leak-tight fit around the threads 55.

One function of the packing 62 is to lubricate the adjusting screw 38, and when this packing is used, no other lubricant need be added during the life of the device. The threads 55 are lubricated directly by contact with the packing 62. The threads 54 and 56 are lubricated indirectly by the packing 62, by oil falling from the threads 55 on to the threads 56, when the screw has been moved in toward its maximum pressure position. By thus lubricating the screw 38, the temptation to use an injurious or dangerous lubricant is eliminated, together with damage traceable to the tampering of would-be lubricators.

An even more important function of the packing 62 is that it keeps all dust out of the adjusting threads 54 and 56, and so acts as a secondary and final dust seal. Any dust which may find its way around the dust cap 42 can still not get into the actual adjusting threads, where dust can do the most harm. Therefore, all the wear of these threads traceable to the abrasive action of foreign matter in the air is eliminated, and the screw 38 has a much longer life than screws heretofore in use.

A third feature of the packing 62 is that it steadies the screw 38. Being compressible it closes around the threads 55 and prevents the screw 38 from wobbling when the threads 54 and 56 do finally begin to wear. This means further insurance that there will be no back lash, and any one position of the screw 38 will always give the same regulator outlet pressure.

The washer 57 prevents retraction of the screw portion 54 past the point where the increased diameter reaches the end 58 of the threads 56. It cannot be screwed back past the washer 57 and so cannot be exposed to dust during normal operation. The screw 38 and its associated parts can be withdrawn only by first removing the lock cap 52, dust cap 42, packing cap 60, packing 62 and washer 57. Therefore, it will not be detached accidentally, misplaced or lost, and danger from tampering is minimized. At the same time, the safety of the regulator is increased for it cannot be dropped off the screw 38, and the diaphragm 25 is protected from accidental damage.

It is to be understood that I have described a preferred example of my invention, and that various changes may be made in the shape, size, material, and arrangement of the parts without departing from the spirit of my invention or the scope of the claims.

I claim:

1. In a gas pressure regulator including a main housing and a cylindrical open ended spring enclosing housing projecting from a wall thereof; the improvement comprising a generally cylindrical adjusting screw housing secured to and projecting axially outwardly from the open end of said spring enclosing housing, a spring tension adjusting screw having its inner end portion disposed within and having threaded engagement with said adjusting screw housing for axial inward and outward adjustment relative thereto, said adjusting screw projecting substantially beyond said adjusting screw housing and having a tool receiving groove in its outer end for effecting adjustment thereof, and a dust-protecting cap including a base portion threadedly engaging said adjusting screw outwardly of said adjusting screw housing for axial adjustment relative thereto and a skirt portion having a free edge engageable with said wall upon axial adjustment of the cap after a predetermined inward spring tensioning adjustment of said adjusting screw, and a lock nut cap on the outer end of said adjusting screw frictionally engageable with the base portion of said cap for locking same against axial movement on the adjusting screw, and said lock nut cap also enclosing the grooved outer end of the adjusting screw.

2. The structure according to claim 1, together with means in said adjusting screw housing operative to limit outward adjustment of the screw, and said skirt including a portion surrounding said spring enclosing housing in spaced relation thereto, and a second portion of reduced diameter in substantially close surrounding relation to a portion of said adjusting screw housing for precluding admission of dust thereto upon retraction of said skirt from engagement with said wall when the outward adjustment of said screw is arrested by said means.

3. The structure according to claim 1, wherein said adjusting screw comprises an inner portion having V-threads and an outer substantially longer portion having square threads on which said cap and lock nut are disposed, a washer within said adjusting screw housing engageable with the rearmost V-thread to limit outward adjustment of the screw, a lubricating and dust sealing packing within the said housing in surrounding relation to the innermost of said square threads, and a packing cap included in the housing and having screw thread engagement with the body portion thereof, said packing cap having a central opening of the diameter of and receiving the adjacent square threads.

References Cited in the file of this patent

UNITED STATES PATENTS

| Number | Name | Date |
|---|---|---|
| 460,075 | Schmedling | Sept. 22, 1891 |
| 1,069,876 | Houser | Aug. 12, 1913 |
| 1,626,581 | Gaunt | Apr. 26, 1927 |
| 1,745,785 | Deming | Feb. 4, 1930 |
| 1,802,002 | Campbell | Apr. 21, 1931 |
| 1,944,428 | Hammon | Jan. 23, 1934 |
| 2,057,150 | Kehl | Oct. 13, 1936 |
| 2,540,371 | Jacobssen | Feb. 6, 1951 |